US012586494B2

(12) United States Patent
Chung

(10) Patent No.: US 12,586,494 B2
(45) Date of Patent: Mar. 24, 2026

(54) COLOR CALIBRATION SYSTEM AND COLOR CALIBRATION METHOD

(71) Applicant: CHAMP VISION DISPLAY INC., Miao-Li County (TW)

(72) Inventor: Hsin-Mao Chung, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/766,665

(22) Filed: Jul. 9, 2024

(65) Prior Publication Data

US 2025/0239191 A1 Jul. 24, 2025

(30) Foreign Application Priority Data

Jan. 18, 2024 (CN) ......................... 202410073973.1

(51) Int. Cl.
*G09G 3/00* (2006.01)

(52) U.S. Cl.
CPC ..... *G09G 3/006* (2013.01); *G09G 2320/0666* (2013.01); *G09G 2320/0693* (2013.01)

(58) Field of Classification Search
None
See application file for complete search history.

(56) References Cited

U.S. PATENT DOCUMENTS

2012/0074851 A1 3/2012 Erinjippurath
2013/0219479 A1* 8/2013 DeSoto .............. G06Q 20/4014 726/6
2014/0366055 A1* 12/2014 Murakami ....... H04N 21/41265 725/30
2025/0024257 A1* 1/2025 Lin ....................... H04L 67/141

FOREIGN PATENT DOCUMENTS

CN 104853180 8/2015
TW 202032977 9/2020

* cited by examiner

*Primary Examiner* — Andre L Matthews
(74) *Attorney, Agent, or Firm* — JCIPRNET

(57) ABSTRACT

A color calibration system and a color calibration method are provided. The color calibration method includes: measuring a first calibration image displayed by a first display device to obtain optical characteristic information by an image capturing device; receiving the optical characteristic information from the image capturing device and converting a data format of the optical characteristic information to generate a first calibration command by a server; and receiving the first calibration command from the server, updating a first display parameter of the first display device according to the first calibration command, and displaying a first output image according to the updated first display parameter by the first display device.

13 Claims, 5 Drawing Sheets

COLOR CALIBRATION SYSTEM AND COLOR CALIBRATION METHOD

CROSS-REFERENCE TO RELATED APPLICATION

This application claims the priority benefit of China application serial no. 202410073973.1 filed on Jan. 18, 2024. The entirety of the above-mentioned patent application is hereby incorporated by reference herein and made a part of this specification.

BACKGROUND

Technical Field

The disclosure relates to an image communication technique, and in particular, to a color calibration system and a color calibration method.

Description of Related Art

Nowadays, the Android operating system has become one of the mainstream architectures in the market, and has driven the development of single-chip systems and applications, and has also led to the emergence of more diverse human-machine interface (HMI) products on the market. In the fields of industrial control or biotechnology and medical care, people often have customized needs for the display quality of HMI. In the production process of an HMI products, manufacturers need to perform a color calibration process on the products to ensure that the display quality of the products meets the requirements. However, most traditional color calibration tools may only support a single operating system and may not be applied to all types of HMI products.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

A color calibration system of an embodiment of the disclosure includes a first display device, an image capturing device, and a server. The image capturing device is adapted to measure a first calibration image displayed by the first display device to obtain optical characteristic information. The server is communicatively connected to the first display device and the image capturing device, wherein the server is adapted to receive the optical characteristic information from the image capturing device, and convert a data format of the optical characteristic information to generate a first calibration command, wherein the first display device is adapted to receive the first calibration command from the server, update a first display parameter of the first display device according to the first calibration command, and display a first output image according to the updated first display parameter.

A color calibration method of an embodiment of the disclosure is adapted to include a first display device, an image capturing device, and a server, wherein the server is communicatively connected to the first display device and the image capturing device, and the method includes: measuring a first calibration image displayed by the first display device to obtain optical characteristic information by the image capturing device; receiving the optical characteristic information from the image capturing device, and converting a data format of the optical characteristic information to generate a first calibration command by the server; and receiving the first calibration command from the server, updating a first display parameter of the first display device according to the first calibration command, and displaying a first output image according to the updated first display parameter by the first display device.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The disclosure provides a color calibration system and a color calibration method that may perform color calibration function for various types of display devices.

Figure 1:
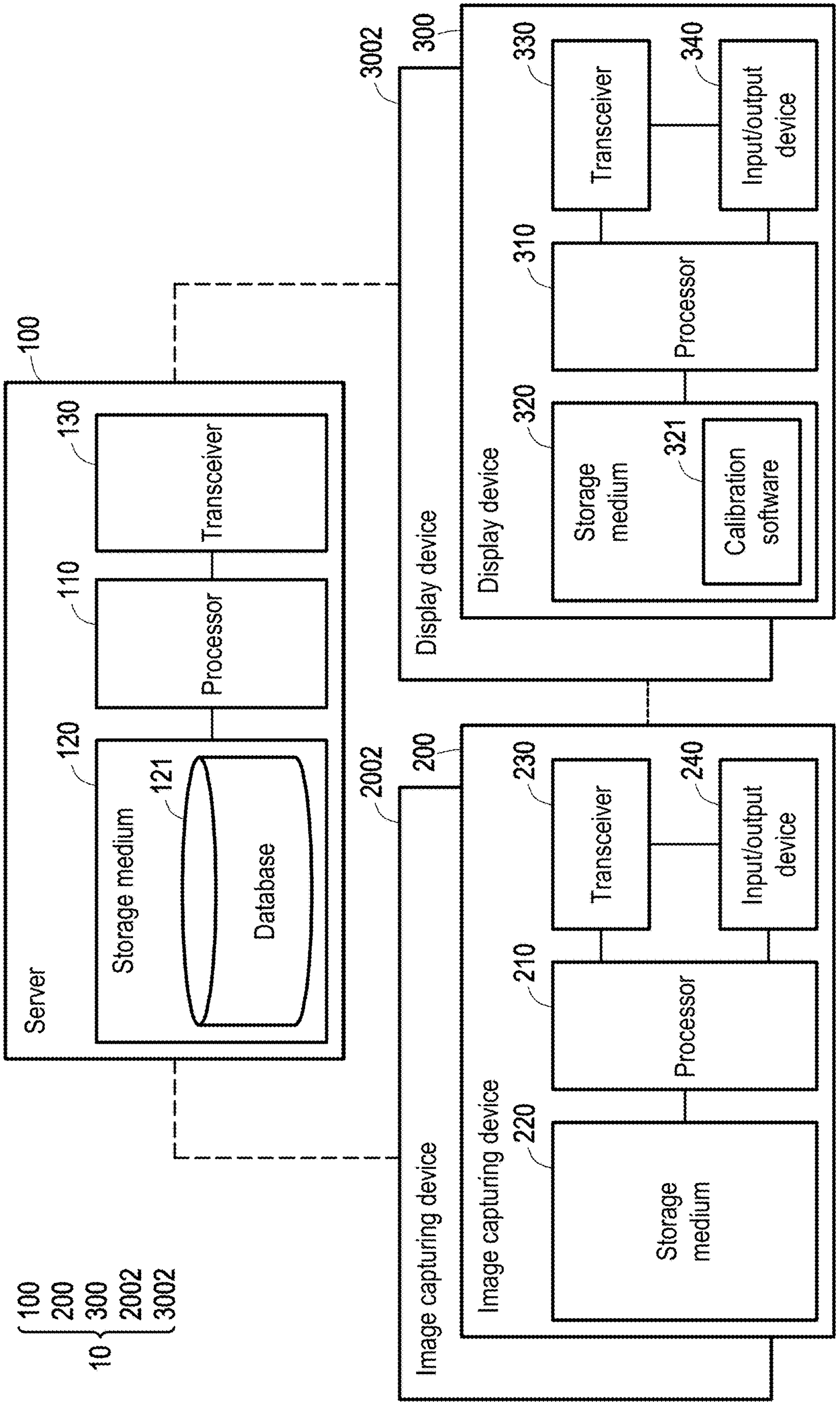
FIG. 1 shows a schematic diagram of a color calibration system according to an embodiment of the disclosure.

FIG. 1 shows a schematic diagram of a color calibration system 10 according to an embodiment of the disclosure. The color calibration system 10 may include a server 100, one or a plurality of image capturing devices (e.g., image capturing device 200 or 2002), and one or a plurality of display devices to be calibrated (e.g., display device 300 or 3002), wherein the plurality of image capturing devices may have similar functions or architectures, and the plurality of display devices may have similar functions and architectures. The server 100 may be communicatively connected to one or a plurality of image capturing devices (e.g., the image capturing device 200 or 2002) and one or more display devices (e.g., the display device 300 or 3002).

The server 100 is, for example, a cloud server. The server 100 may include a processor 110, a storage medium 120, and a transceiver 130.

The processor 110 is, for example, a central processing unit (CPU), or other programmable general-purpose or special-purpose micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field-programmable gate array (FPGA), or other similar elements, or a combination of the above elements. The processor 110 may be coupled to the storage medium 120 and the transceiver 130, and access and execute a plurality of modules and various applications stored in the storage medium 120.

The storage medium 120 is, for example, any type of fixed or removable random-access memory (RAM), read-only memory (ROM), flash memory, hard disk drive (HDD), solid state drive (SSD), or similar elements, or a combination of the above elements, and is used to store a plurality of modules or various applications that may be executed by the processor 110. In the embodiment, the storage medium 120 may store a database 121, and the function thereof is described later.

The transceiver 130 sends or receives a signal in a wireless or wired manner. The transceiver 130 may also execute an operation such as low noise amplification, impedance matching, frequency mixing, up or down frequency conversion, filtering, amplification, and the like. The server 100 may be communicatively connected to the image capturing device 200, the image capturing device 2002, the display device 300, or the display device 3002 via the transceiver 130.

The image capturing device 200 may include a processor 210, a storage medium 220, a transceiver 230, and an input/output device 240.

The processor 210 is, for example, a central processing unit (CPU), or other programmable general-purpose or special-purpose micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field-programmable gate array (FPGA), or other similar elements, or a combination of the above elements. The processor 210 may be coupled to the storage medium 220, the transceiver 230, and the input/output device 240, and access and execute a plurality of modules and various applications stored in the storage medium 220.

The storage medium 220 is, for example, any type of fixed or removable random-access memory, read-only memory, flash memory, hard disk drive, solid state drive, or similar elements or a combination of the above elements, and is used to store a plurality of modules or various applications that may be executed by the processor 210.

The transceiver 230 sends or receives a signal in a wireless or wired manner. The transceiver 230 may also execute an operation such as low noise amplification, impedance matching, frequency mixing, up or down frequency conversion, filtering, amplification, and the like. The image capturing device 200 may be communicatively connected to the server 100, the display device 300, or the display device 3002 via the transceiver 230.

The input/output device 240 may include a device such as a mouse, a keyboard, a camera, an image sensor, a display, or a speaker. The processor 210 may receive a user command, capture an image (e.g., capture an image displayed by the display device 300), or output information (e.g., output an image or an audio) via the input/output device 240.

The display device 300 may include a processor 310, a storage medium 320, a transceiver 330, and an input/output device 340.

The processor 310 is, for example, a central processing unit (CPU), or other programmable general-purpose or special-purpose micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field-programmable gate array (FPGA), or other similar elements, or a combination of the above elements. The processor 310 may be coupled to the storage medium 320, the transceiver 330, and the input/output device 340, and access and execute a plurality of modules and various applications stored in the storage medium 320.

The storage medium 320 is, for example, any type of fixed or removable random-access memory, read-only memory, flash memory, hard disk drive, solid state drive, or similar elements or a combination of the above elements, and is used to store a plurality of modules or various applications that may be executed by the processor 310. In the embodiment, the storage medium 320 may store a calibration software 321, and the function thereof is described later.

The transceiver 330 sends or receives a signal in a wireless or wired manner. The transceiver 330 may also execute an operation (function) such as low noise amplification, impedance matching, frequency mixing, up or down frequency conversion, filtering, amplification, and the like. The display device 300 may be communicatively connected to the server 100, the image capturing device 200, or the image capturing device 2002 via the transceiver 330.

The input/output device 340 may include a device such as a mouse, a keyboard, a camera, an image sensor, a display, or a speaker. The processor 310 may receive a user command or output information (e.g., output an image or an audio) via the input/output device 340.

Figure 2:
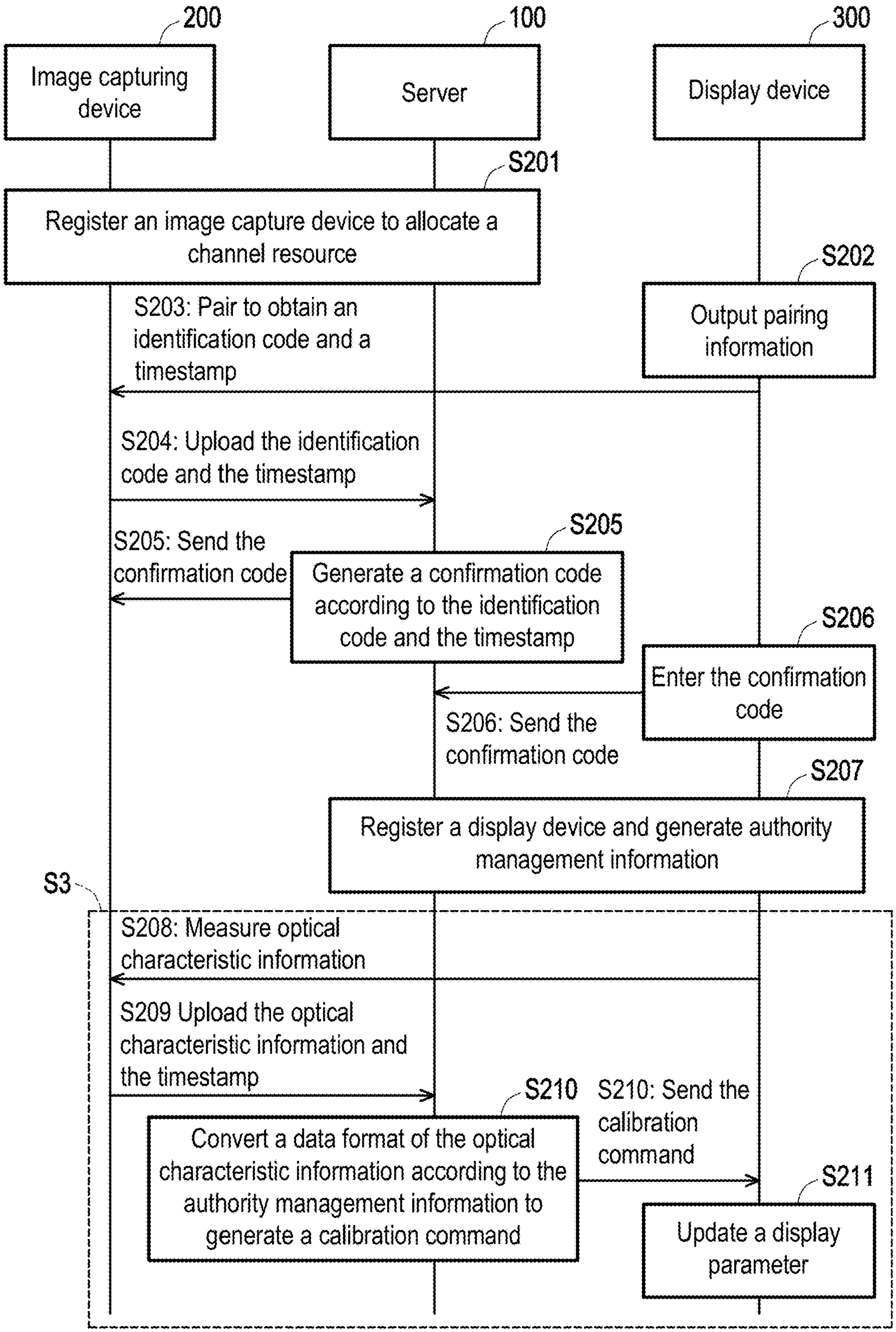
FIG. 2 shows a signaling diagram of a color calibration method according to an embodiment of the disclosure.

FIG. 2 shows a signaling diagram of a color calibration method according to an embodiment of the disclosure. The color calibration system 10 may perform the steps of FIG. 2 to complete the color calibration of the display device 300.

In step S201, the server 100 may register the image capturing device 200 to allocate corresponding channel information for data transmission of the image capturing device 200. Specifically, the imaging capturing device 200 may send a registration message to the server 100. The server 100 may allocate a channel resource to the image capturing device 200 according to the registration information. The channel resource may include, but is not limited to, a time domain resource (such as a time slot) or a frequency domain resource (such as a bandwidth) needed for data transmission in a wireless network.

In step S202, the display device 300 may output pairing information. Specifically, the display device 300 may generate pairing information according to an identification code of the display device 300 (for example, a device identification code), and output the pairing information via the transceiver 330 or the input/output device 340. For example, the processor 310 may output the pairing information to an equipment (e.g., the image capturing device 200) communicatively connected to the display device 300 via the transceiver 330. As another example, the processor 310 may display an image including the pairing information via the input/output device 340. The pairing information is displayed in the form of a two-dimensional barcode, for example. In an embodiment, the calibration software 321 may display the calibration image including the pairing information via the input/output device 340.

In step S203, the image capturing device 200 may obtain pairing information from the display device 300, and obtain an identification code corresponding to the display device 300 from the pairing information. In addition, the image capturing device 200 may further obtain a time stamp for synchronization from the display device 300. In an embodiment, the processor 210 of the image capturing device 200 may capture the pairing information in the image displayed by the input/output device 340 of the display device 300 via the input/output device 240. In an embodiment, the processor 210 may receive the pairing information output by the transceiver 330 of the display device 300 via the transceiver 230.

In step S204, the processor 210 of the image capturing device 200 may upload the identification code to the server 100 via the transceiver 230. In addition, the processor 210 may further upload the time stamp for synchronization to the server 100.

In step S205, the processor 110 of the server 100 may generate a confirmation code corresponding to the identification code according to the identification code and/or the time stamp, and may send the confirmation code to the image capturing device 200 via the transceiver 130. The image capturing device 200 may output the confirmation code via the input/output device 240 for the user's reference.

In step S206, after the user obtains the confirmation code output by the image capturing device 200, the user may input the confirmation code to the display device 300 via the input/output device 340 of the display device 300. The display device 300 may upload the confirmation code to the server 100 via the transceiver 330.

In step S207, the server 100 may register the display device 300 and generate authority management information according to the confirmation code uploaded by the display device 300. The authority management information includes, for example, the valid upload time of data. That is, the image capturing device 200 or the display device 300 may be restricted to complete the color calibration within the time range specified by the authority management information. After step S207 is completed, the registration procedures of the image capturing device 200 and the display device 300 are both successfully completed. The color calibration system 10 may start to perform the color calibration process S3.

In step S208, the processor 210 of the image capturing device 200 may measure the calibration image displayed by the input/output device 340 (e.g., display) of the display device 300 via the input/output device 240 (e.g., camera, image sensor), thereby obtaining optical characteristic information. The optical characteristic information may include, but not limited to, brightness, contrast, color balance, RGB gain, color temperature, gamma, resolution, or refresh rate.

In an embodiment, the image capturing device 200 may periodically measure the optical characteristic information. In an embodiment, the display device 300 may send a request message to the image capturing device 200 via the transceiver 330. The image capturing device 200 may measure the optical characteristic information of the image displayed by the display device 300 according to the request message. That is, the image capturing device 200 may measure the optical characteristic information in an on-demand manner.

In step S209, the image capturing device 200 may upload the optical characteristic information and/or the time stamp for synchronization to the server 100 via the transceiver 230. The server 100 may receive the optical characteristic information from the image capturing device 200 based on the channel resource allocated to the image capturing device 200.

In step S210, the processor 110 of the server 100 may convert the data format of the optical characteristic information to generate a calibration command that may be supported (read) by the calibration software 321 of the display device 300. Then, the processor 110 may send the calibration command to the display device 300 corresponding to the identification code via the transceiver 130. The processor 110 may determine to send the calibration command to the source (i.e., the display device 300) of the confirmation code based on the confirmation code received in step S206.

In an embodiment, the processor 110 may generate a calibration command when the received optical characteristic information matches the authority management information. Specifically, if the timestamp corresponding to the optical characteristic information matches the valid upload time of the authority management information, the processor 110 may determine that the optical characteristic information uploaded by the image capturing device 200 is valid. Accordingly, the processor 110 may generate the calibration command corresponding to the optical characteristic information.

In step S211, the calibration software 321 of the display device 300 may update the display parameter of the display device 300 according to the calibration command, and display the output image via the input/output device 340 according to the updated display parameter. The display parameter may include, but is not limited to, brightness, contrast, color balance, RGB gain, color temperature, gamma, resolution, or refresh rate.

The color calibration system 100 may iteratively execute the process S3 (e.g., S208 to S211) until the color calibration of the display device 300 is completed.

In an embodiment, after the color calibration of the display device 300 is completed, the server 100 may store the current optical characteristic information or display parameter of the display device 300 in the database 121. In the future, when the user is to recalibrate the display device 300, the display device 300 only needs to access the database 121 via the network to obtain the display parameter without having to execute the process S3 again.

Figure 3:
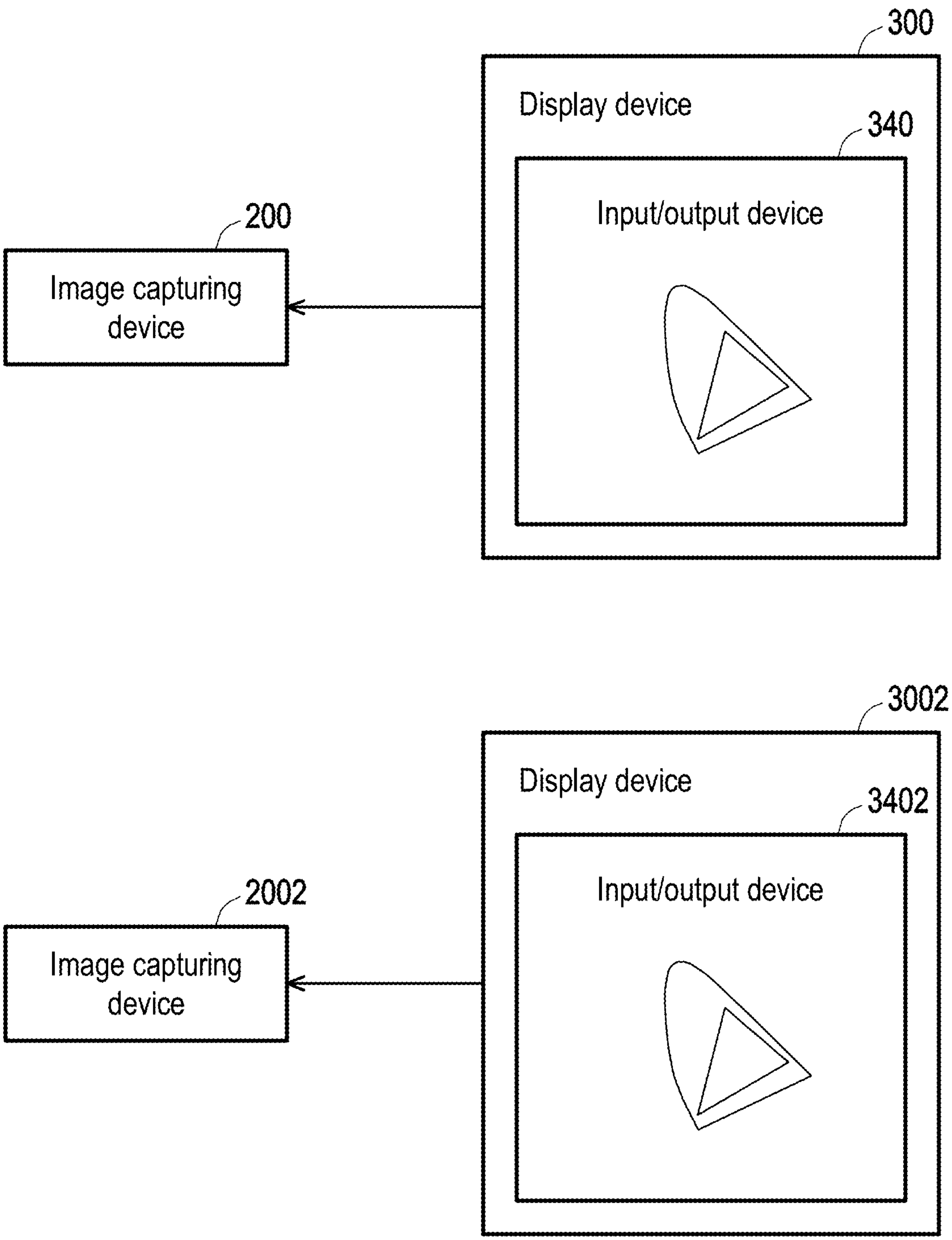
FIG. 3 shows a schematic diagram of performing simultaneous color calibration for a plurality of display devices based on a plurality of image capturing devices according to an embodiment of the disclosure.

FIG. 3 shows a schematic diagram of performing simultaneous color calibration for a plurality of display devices based on a plurality of image capturing devices according to an embodiment of the disclosure. The color calibration system 10 may measure the optical characteristic information of the calibration image displayed by the input/output device 340 of the display device 300 via the image capturing device 200, and the optical characteristic information of the calibration image displayed by an input/output device 3402 of the display device 3002 may be measured via the image capturing device 2002. The server 100 may convert the data format of the optical characteristic information uploaded by the image capturing device 200 to generate a calibration command for calibrating the display device 300, and send the calibration command to the display device 300. The display device 300 may update the display parameter according to the calibration command, and display the output image according to the updated display parameter. Moreover, the server 100 may convert the data format of the optical characteristic information uploaded by the image capturing device 2002 to generate a calibration command for calibrating the display device 3002, and send the calibration command to the display device 3002. The display device 3002 may update the display parameter according to the calibration command, and display the output image according to the updated display parameter.

Figure 4:
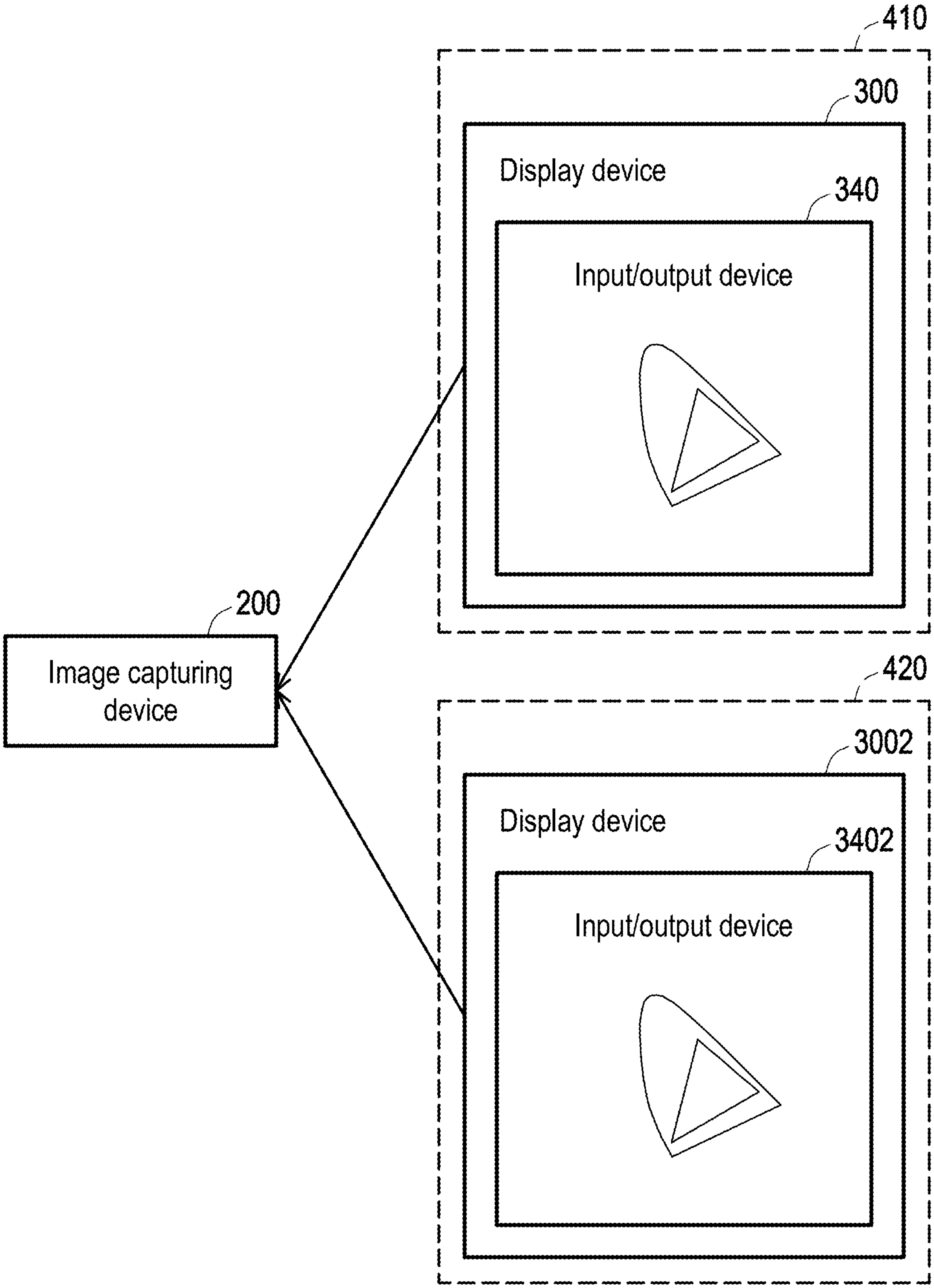
FIG. 4 shows a schematic diagram of performing simultaneous color calibration for an N number of display devices based on a single image capturing device according to an embodiment of the disclosure.

FIG. 4 shows a schematic diagram of performing simultaneous color calibration for an N number (N is a positive integer greater than 1) of display devices based on a single image capturing device according to an embodiment of the disclosure. The image capturing device 200 may detect the calibration image displayed by the input/output device 340 of the display device 300 via the input/output device 240 to determine the detection area 410, and may detect the calibration image displayed by the input/output device 3402 of the display device 3002 to determine the detection area 420. After the detection area 410 and the detection area 420 are determined, the optical characteristic information measured by the image capturing device 200 may include measurement data corresponding to the detection area 410 and measurement data corresponding to the detection area 420. Therefore, the optical characteristic information may generate a plurality of calibration commands for calibrating the display device 300 and the display device 3002 respectively.

Specifically, after the server 100 receives the optical characteristic data uploaded by the image capturing device 200, the server 100 may perform format conversion on the measurement data corresponding to the detection area 410 in the optical characteristic data to generate a calibration command for calibrating the display device 300. The display device 300 may receive the calibration command to update the display parameter according to the calibration command. Moreover, the server 100 may perform format conversion on the measurement data corresponding to the detection area 420 in the optical characteristic data to generate a calibration command for calibrating the display device 3002. The display device 3002 may receive the calibration command to update the display parameter according to the calibration command.

Figure 5:
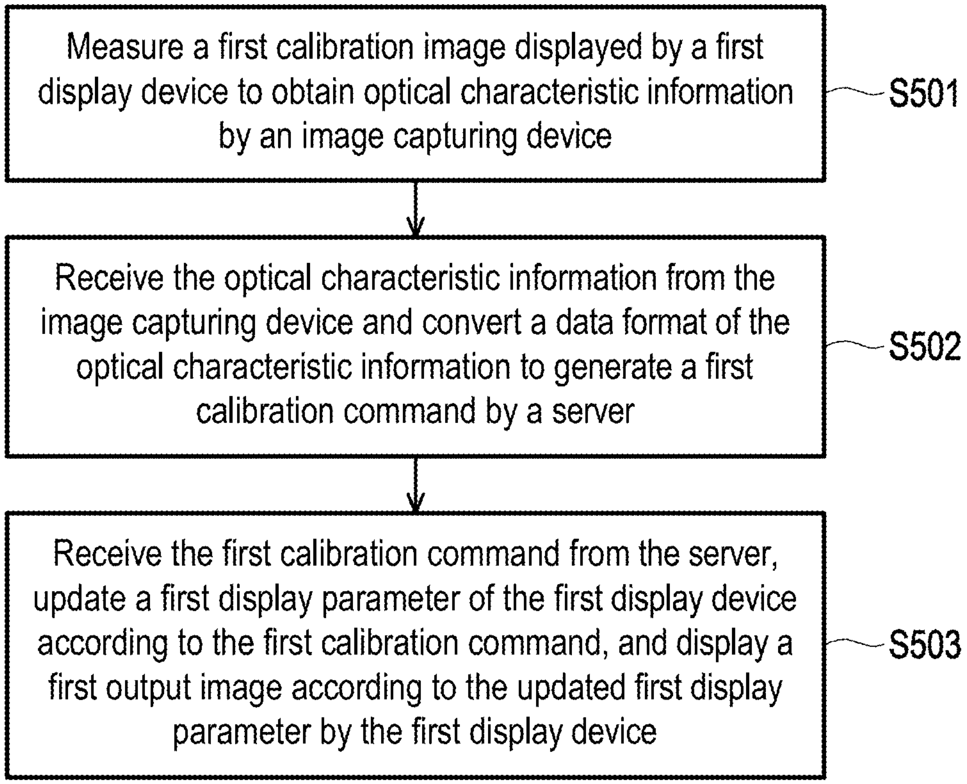
FIG. 5 shows a flowchart of a color calibration method according to an embodiment of the disclosure.

FIG. 5 shows a flowchart of a color calibration method according to an embodiment of the disclosure, wherein the color calibration method may be implemented by the color calibration system 10 shown in FIG. 1. In step S501, a first calibration image displayed by a first display device is measured by an image capturing device to obtain optical characteristic information. In step S502, a server receives the optical characteristic information from the image capturing device, and converts a data format of the optical characteristic information to generate a first calibration command. In step S503, the first display device receives the first calibration command from the server, updates a first display parameter of the first display device according to the first calibration command, and displays a first output image according to the updated first display parameter.

Based on the above, the server of the disclosure allocates a dedicated channel resource to the display device to be calibrated and the corresponding image capturing device via a registration procedure. The image capturing device can measure the optical characteristic information of the display device and upload the optical characteristic information to the server based on the allocated channel resource. The server may convert the optical characteristic information into a data format to generate a calibration command, and control the display device to adjust the display parameter via the calibration command. Accordingly, in addition to performing color calibration for display devices having different types of operating systems, the disclosure may also perform color calibration for a plurality of display devices simultaneously based on a single or a plurality of image capturing devices. The color calibration system of an embodiment of the disclosure has at least the following advantages: the disclosure may be used to perform color calibration for a display device that may not support traditional software development kit (SDK) color calibration software. After color calibration is completed for the display device, the server may store the display parameter in the cloud for the display device to be calibrated to read, thereby reducing the cost of the storage medium in the display device. The display device or the image capturing device of the disclosure only needs to have a network access function to use the color calibration service provided by the server. There is no need to design a physical input or output interface on the device. Therefore, production costs may be reduced (for example: mold openings, connectors, or waterproofing requirements). The disclosure may perform color calibration for a plurality of display devices at the same time, thereby increasing product production efficiency. Color calibration systems may be provided to customers with a more flexible business model via application licensing.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A color calibration system, comprising:

a first display device;

an image capturing device adapted to measure a first calibration image displayed by the first display device to obtain optical characteristic information, wherein the image capturing device is adapted to receive a request message from the first display device, and measure the optical property information of the first calibration image according to the request message; and a server communicatively connected to the first display device and the image capturing device, wherein the server is adapted to receive the optical characteristic information from the image capturing device, and convert a data format of the optical characteristic information to generate a first calibration command, wherein the first display device is adapted to receive the first calibration command from the server, update a first display parameter of the first display device according to the first calibration command, and display a first output image according to the updated first display parameter.

2. The color calibration system of claim 1, wherein the image capturing device is adapted to send a registration message to the server, and the server is adapted to allocate a channel resource to the image capturing device according to the registration message, wherein the server receives the optical characteristic information from the image capturing device based on the channel resource.

3. The color calibration system of claim 1, wherein the first display device is adapted to generate pairing information according to an identification code of the first display device, wherein the image capturing device is adapted to obtain the pairing information from the first display device, and obtain the identification code from the pairing information, and the image capturing device sends the pairing information to the server, wherein the server is adapted to send the first calibration command to the first display device corresponding to the identification code.

4. The color calibration system of claim 3, wherein the first calibration image comprises the pairing information.

5. The color calibration system of claim 3, wherein the image capturing device is communicatively connected to the first display device to obtain the pairing information from the first display device.

6. The color calibration system of claim 3, wherein the server is adapted to send a confirmation code corresponding to the identification code to the image capturing device, and the image capturing device is adapted to output the confirmation code, wherein the first display device is adapted to upload the confirmation code to the server, and the server sends the first calibration command to the first display device based on the confirmation code.

7. The color calibration system of claim 6, wherein the server is adapted to generate authority management information according to the confirmation code, and generate the first calibration command in response to the optical characteristic information received from the image capturing device matching the authority management information.

8. The color calibration system of claim 7, wherein the authority management information comprises a valid upload time, wherein the server generates the first calibration command in response to a time stamp of the optical characteristic information matching the valid upload time.

9. The color calibration system of claim 1, further comprising:

a second display device communicatively connected to the server and adapted to display a second calibration image, wherein the image capturing device is adapted to detect the first calibration image to determine a first detection area, and detect the second calibration image to determine a second detection area, wherein the optical characteristic information comprises first measurement data corresponding to the first detection area and second measurement data corresponding to the second detection area.

10. The color calibration system of claim 9, wherein the server is adapted to convert a data format of the optical characteristic information to generate a second calibration command, wherein the second display device is adapted to receive the second calibration command from the server, update a second display parameter of the second display device according to the second calibration command, and display a second output image according to the updated second display parameter.

11. The color calibration system of claim 1, wherein the optical characteristic information comprises at least one of the following: a brightness, a contrast, a color balance, a color temperature, a gamma, a resolution, and a refresh rate.

12. The color calibration system of claim 1, wherein the image capturing device is adapted to periodically measure the optical characteristic information.

13. A color calibration method, adapted to comprise a first display device, an image capturing device, and a server, wherein the server is communicatively connected to the first display device and the image capturing device, and the method comprises:

measuring a first calibration image displayed by the first display device to obtain optical characteristic information by the image capturing device, wherein receiving a request message from the first display device, and measuring the optical property information of the first calibration image according to the request message by the image capturing device;

receiving the optical characteristic information from the image capturing device, and converting a data format of the optical characteristic information to generate a first calibration command by the server; and receiving the first calibration command from the server, updating a first display parameter of the first display device according to the first calibration command, and displaying a first output image according to the updated first display parameter by the first display device.

* * * * *